US012313132B2

(12) United States Patent
Kittaka et al.

(10) Patent No.: US 12,313,132 B2
(45) Date of Patent: May 27, 2025

(54) CONTROL DEVICE

(71) Applicant: HONDA MOTOR CO., LTD., Tokyo (JP)

(72) Inventors: Eiji Kittaka, Tokyo (JP); Yasushi Fujimoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/825,418

(22) Filed: Sep. 5, 2024

(65) Prior Publication Data

US 2024/0426353 A1 Dec. 26, 2024

Related U.S. Application Data

(63) Continuation of application No. PCT/JP2022/010329, filed on Mar. 9, 2022.

(51) Int. Cl.
*F16D 48/06* (2006.01)

(52) U.S. Cl.
CPC ........ *F16D 48/064* (2013.01); *F16D 2300/18* (2013.01); *F16D 2500/1117* (2013.01);
(Continued)

(58) Field of Classification Search
CPC .............. F16D 48/064; F16D 2300/18; F16D 2500/1117; F16D 2500/3021;
(Continued)

(56) References Cited

U.S. PATENT DOCUMENTS 7,690,474 B2 * 4/2010 Iwashita ................. F16D 48/04
192/96
11,162,546 B2 11/2021 Ono et al.
(Continued)

FOREIGN PATENT DOCUMENTS

EP 3 101 300 A1 12/2016
JP 2006-170228 A 6/2006
(Continued)

OTHER PUBLICATIONS

International Search Report dated Apr. 26, 2022, issued in counterpart International Application No. PCT/JP2022/010329, with English Translation. (5 pages).
(Continued)

*Primary Examiner* — Timothy Hannon
(74) *Attorney, Agent, or Firm* — WHDA, LLP

(57) ABSTRACT

A control device includes a connecting member connected to a release operation member of a clutch device, an electric actuator connected to the connecting member, the electric actuator being configured to displace the release operation member through the connecting member, a control unit configured to displace the release operation member by driving the electric actuator so as to change a clutch capacity of the clutch device, a first sensor configured to detect an operation amount of the electric actuator with respect to the connecting member, and a second sensor configured to detect displacement amount of the release operation member. The control unit generates characteristic information regarding the clutch capacity, and performs a control to change the clutch capacity. The characteristic information is generated based on each detection result of the first and second sensors at time of driving the electric actuator.

12 Claims, 10 Drawing Sheets

(52) U.S. Cl.
CPC ............... *F16D 2500/3021* (2013.01); *F16D 2500/3026* (2013.01); *F16D 2500/5012* (2013.01); *F16D 2500/50236* (2013.01)

(58) Field of Classification Search
CPC ..... F16D 2500/3026; F16D 2500/5012; F16D 2500/70422; F16D 2500/50236
See application file for complete search history.

(56) References Cited

U.S. PATENT DOCUMENTS

| | | | |
|---|---|---|---|
| 2013/0008760 A1* | 1/2013 | Mizuno | F16D 23/12 192/82 R |
| 2017/0089412 A1 | 3/2017 | Oshiumi | |
| 2021/0215209 A1 | 7/2021 | Matsuura et al. | |
| 2021/0277966 A1* | 9/2021 | Matsuura | F16D 48/08 |
| 2023/0095322 A1* | 3/2023 | Ryuzaki | F16D 48/06 477/166 |
| 2023/0107472 A1* | 4/2023 | Ozeki | B60W 30/18136 701/94 |

FOREIGN PATENT DOCUMENTS

| | | |
|---|---|---|
| JP | 2010-167798 A | 8/2010 |
| JP | 2015-218740 A | 12/2015 |
| JP | 2016-222151 A | 12/2016 |
| JP | 2018-189134 A | 11/2018 |
| WO | 2015/051943 A1 | 4/2015 |

OTHER PUBLICATIONS

Written Opinion of the International Searching Authority (Form PCT/ISA/237) dated Apr. 26, 2022, issued in counterpart International Application No. PCT/JP2022/010329. (4 pages).

Extended (Supplementary) European Search Report dated Feb. 24, 2025, issued in counterpart EP Application No. 22930812.7. (6 pages).

* cited by examiner

CONTROL DEVICE

CROSS-REFERENCE TO RELATED APPLICATION(S)

This application is a Continuation of International Patent Application No. PCT/JP2022/010329, filed Mar. 9, 2022, the entire disclosures of which is incorporated herein by reference.

BACKGROUND OF THE INVENTION

Field of the Invention

The present invention relates to a technology for controlling a clutch device.

Description of the Related Art

A technology for automatically connecting and disconnecting a clutch device has been proposed. Japanese Patent Laid-Open No. 2006-170228 discloses a device capable of automatically controlling a clutch device that connects and disconnects transmission of an output of a prime mover (engine) of a straddle type vehicle.

In the conventional device, there is room for an improvement in terms of structural complexity that causes an increase in cost.

SUMMARY OF THE INVENTION

An object of the present invention is to provide a control device capable of realizing an automatic control of a clutch device with a relatively simple configuration.

According to an aspect of the present invention, there is provided a control device for controlling a clutch device disposed on a path along which a driving force output from a prime mover is transmitted, the clutch device being configured to connect or disconnect transmission of the driving force, the control device comprising: a connecting member connected to a release operation member of the clutch device; an electric actuator connected to the connecting member, the electric actuator being configured to displace the release operation member through the connecting member; a control unit configured to displace the release operation member by driving the electric actuator so as to change a clutch capacity of the clutch device; a first sensor for detect an operation amount of the electric actuator with respect to the connecting member; and a second sensor configured to detect a displacement amount of the release operation member, wherein the control unit is configured to generate characteristic information regarding the clutch capacity in advance, and to perform a control to change the clutch capacity based on the generated characteristic information, the characteristic information is generated based on each detection result of the first sensor and the second sensor at time of driving the electric actuator to change the displacement amount of the release operation member, and the connecting member is connected to the release operation member through an elastic member having an elastic coefficient smaller than an elastic coefficient of the connecting member.

Further features of the present invention will become apparent from the following description of exemplary embodiments (with reference to the attached drawings).

DESCRIPTION OF THE EMBODIMENTS

Figure 1:
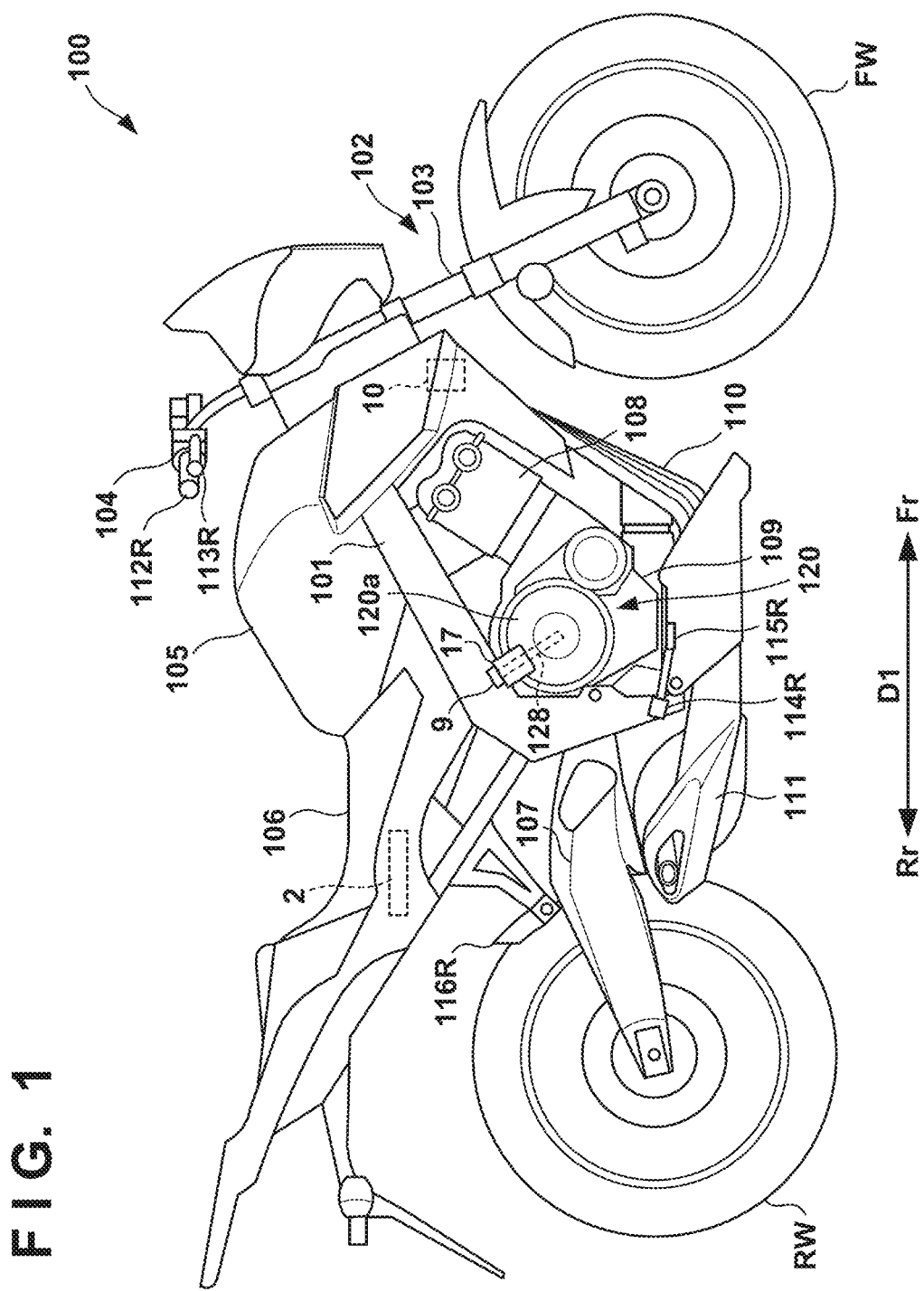
FIG. 1 is a side view of a straddle type vehicle.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

<Outline of Straddle Type Vehicle>

Figure 2:
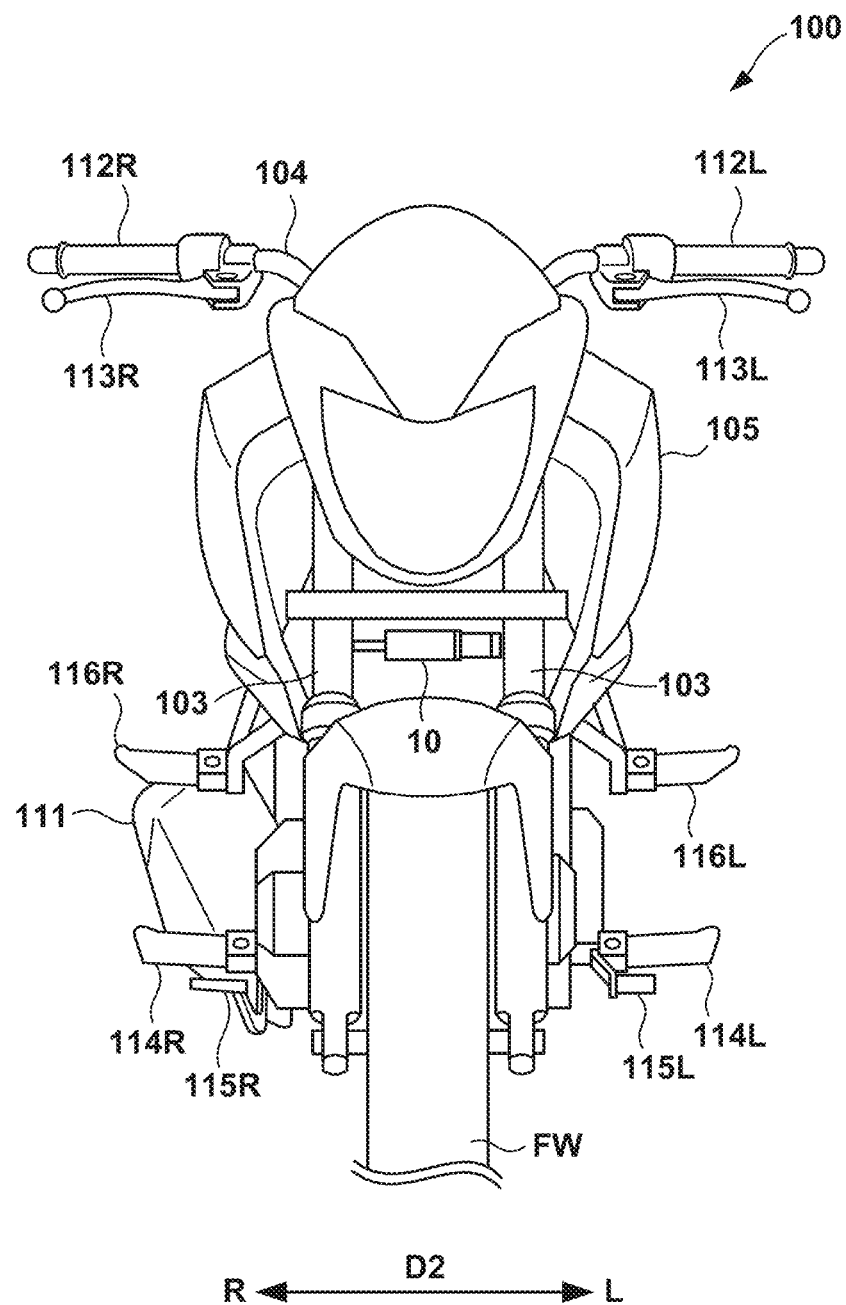
FIG. 2 is a front view of the straddle type vehicle of FIG. 1.

FIGS. 1 and 2 are a side view and a front view of a straddle type vehicle (hereinafter, simply referred to as a vehicle) 100. The vehicle 100 is a motorcycle including one front wheel FW and one rear wheel RW. In the drawing, an arrow D1 indicates a front-and-rear direction of the vehicle 100, and an arrow D2 indicates a width direction (a left-and-right direction). Fr represents a front side, and Rr represents a rear side. R represents a right side at the time of forward movement, and L represents a left side at the time of forward movement.

The vehicle 100 includes a vehicle body frame 101, which forms its skeleton. A front wheel steering unit 102 is supported at a front end of the vehicle body frame 101, and a swing arm 107 is swingably supported at a rear end of the vehicle body frame 101. The front wheel steering unit 102 includes a pair of left and right front forks 103 supporting the front wheel FW, and a steering handle 104 attached to an upper portion of the pair of front forks 103.

A right grip 112R of the steering handle 104 is an operating element (an accelerator grip) with which a rider is able to instruct the vehicle 100 to accelerate. An operating element (a brake lever) 113R that receives a braking operation of the rider with respect to the front wheel FW is rotatably provided adjacent to the right grip 112R. An operating element (a clutch lever) 113L that receives a connecting/disconnecting operation of the rider with respect to a clutch device 120 is rotatably provided adjacent to a left grip 112L of the steering handle 104.

A front end of the swing arm 107 is swingably supported by the vehicle body frame 101, and the rear wheel RW is supported by a rear end of the swing arm 107. A prime mover 108 and a transmission 109 are supported by the vehicle body frame 101 in a region between the front wheel FW and the rear wheel RW. In the present embodiment, the prime mover 108 is an internal combustion engine, and is particularly a parallel four-cylinder four-stroke DOHC water-cooled engine. Exhaust gas of the prime mover 108 is discharged through an exhaust passage including an exhaust pipe 110 and a muffler 111.

The clutch device 120 is disposed on a path along which a driving force output from the prime mover 108 is transmitted. In the present embodiment, the clutch device 120 is disposed between the prime mover 108 and the transmission 109, and connects and disconnects the transmission of the driving force of the prime mover 108 to and from the transmission 109.

The driving force of the prime mover 108 is transmitted to the rear wheel RW through the transmission 109 and a chain transmission mechanism (not illustrated). A fuel tank 105 is disposed above the prime mover 108, and a seat 106 on which the rider is to be seated is disposed behind the fuel tank 105.

The transmission 109 is a manual and constant-mesh type transmission that changes the output of the prime mover 108. The transmission 109 is switched between a plurality of gear ratios (for example, 1st-speed to 6th-speed gear ratios) and neutral according to a shift operation of the rider with respect to an operating element 115L (a gear change pedal). The operating element 115L is provided adjacent to a left step 114L so as to be operable by the rider. The rider can place his/her left foot on the left step 114L and operate the operating element 115L with the left foot.

An operating element 115R is a brake pedal provided adjacent to a right step 114R so as to be operable by the rider. The rider can perform an operation of braking the rear wheel RW by placing his/her right foot on the right step 114R and operating the operating element 115R with the right foot. Steps 116R and 116L are steps for a passenger.

In the present embodiment, the clutch device 120 is a wet multi-plate coil spring type clutch, and connection and disconnection thereof are automated by an electric actuator 10. The electric actuator 10 is disposed behind the front wheel steering unit 102 in a front portion of the vehicle 100. A control unit 2 is disposed below the seat 106. The control unit 2 controls the electric actuator 10, etc.

<Control Device>

Figure 3:
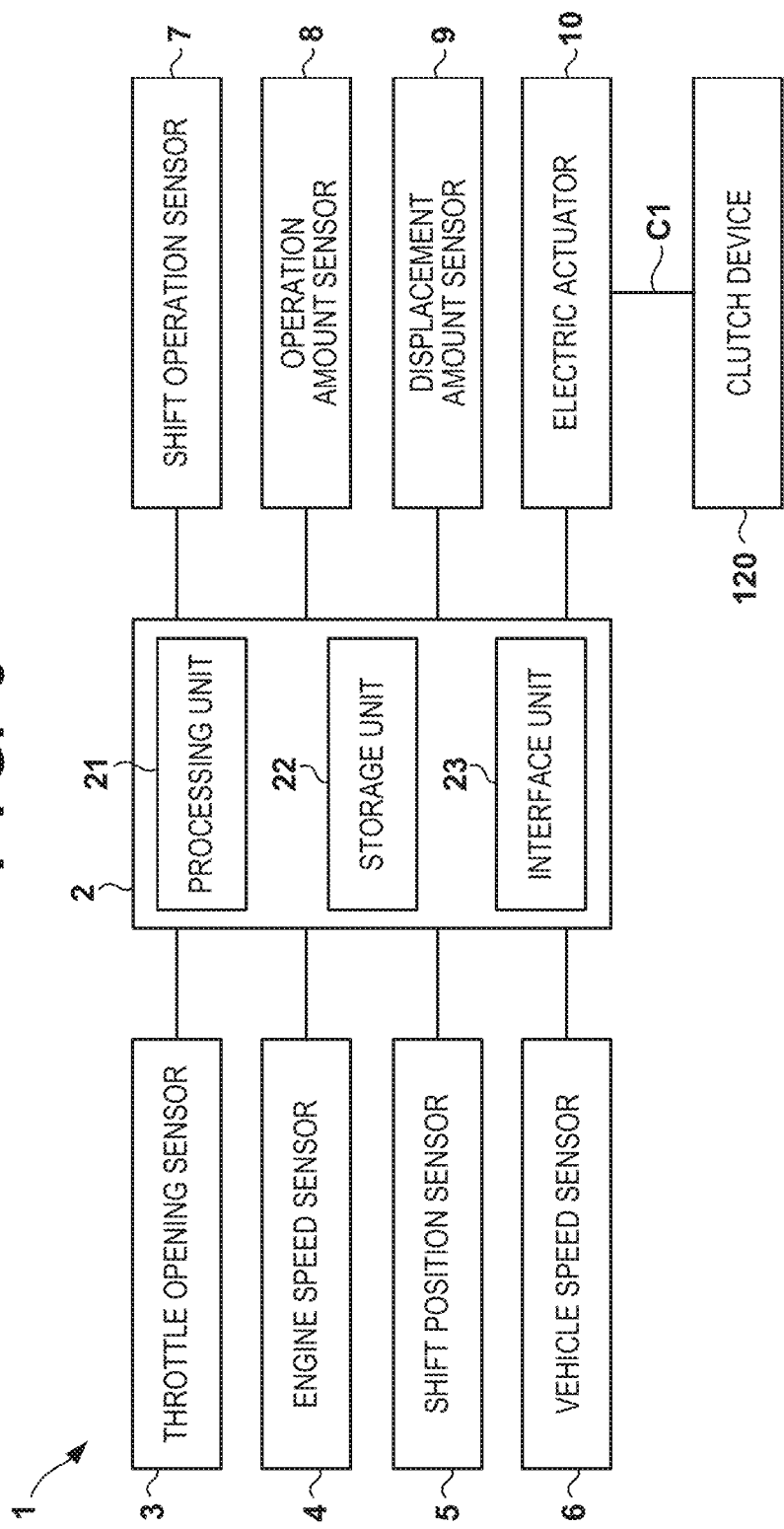
FIG. 3 is a block diagram of a control device.

FIG. 3 is a block diagram of a control device 1 that controls the clutch device 120. The control device 1 includes the control unit 2. The control unit 2 includes a processing unit 21, a storage unit 22, and an interface unit 23. The processing unit 21 is a processor represented by a CPU, and executes a program stored in the storage unit 22. The storage unit 22 is a storage device such as a semiconductor memory, and stores a program to be executed by the processing unit 21, data to be used for processing, and the like. The interface unit 23 inputs and outputs data to and from the processing unit 21 and a device outside the control unit 2. As will be described below, the processing unit 21 drives the electric actuator 10 on the basis of detection results of various sensors 3 to 9, and executes a control to change a clutch capacity of the clutch device 120.

A throttle opening sensor 3 is a sensor that detects a degree to which a throttle valve that adjusts an inflow amount of air into each combustion chamber of the prime mover 108 is open, and is, for example, a rotary encoder that detects a rotation amount of a throttle shaft. An engine speed sensor 4 is a sensor that detects a speed of the prime mover 108, and is, for example, a magnetic crank angle sensor that detects a crank angle of the prime mover 108.

A shift position sensor 5 is a sensor that detects a state (for example, one of 1st to 6th gears or neutral) of the transmission 109, and is, for example, a sensor that detects a rotation angle of a shift drum (not illustrated) of the transmission 109. A vehicle speed sensor 6 is a sensor that detects a vehicle speed of the vehicle 100, and is, for example, a sensor that detects a rotation amount of the front wheel FW. A shift operation sensor 7 is a sensor that detects a shift operation of the rider with respect to the operating element 115L, and is, for example, a torque sensor that detects a load acting on a rotation center axis of the operating element 115L.

Figure 4:
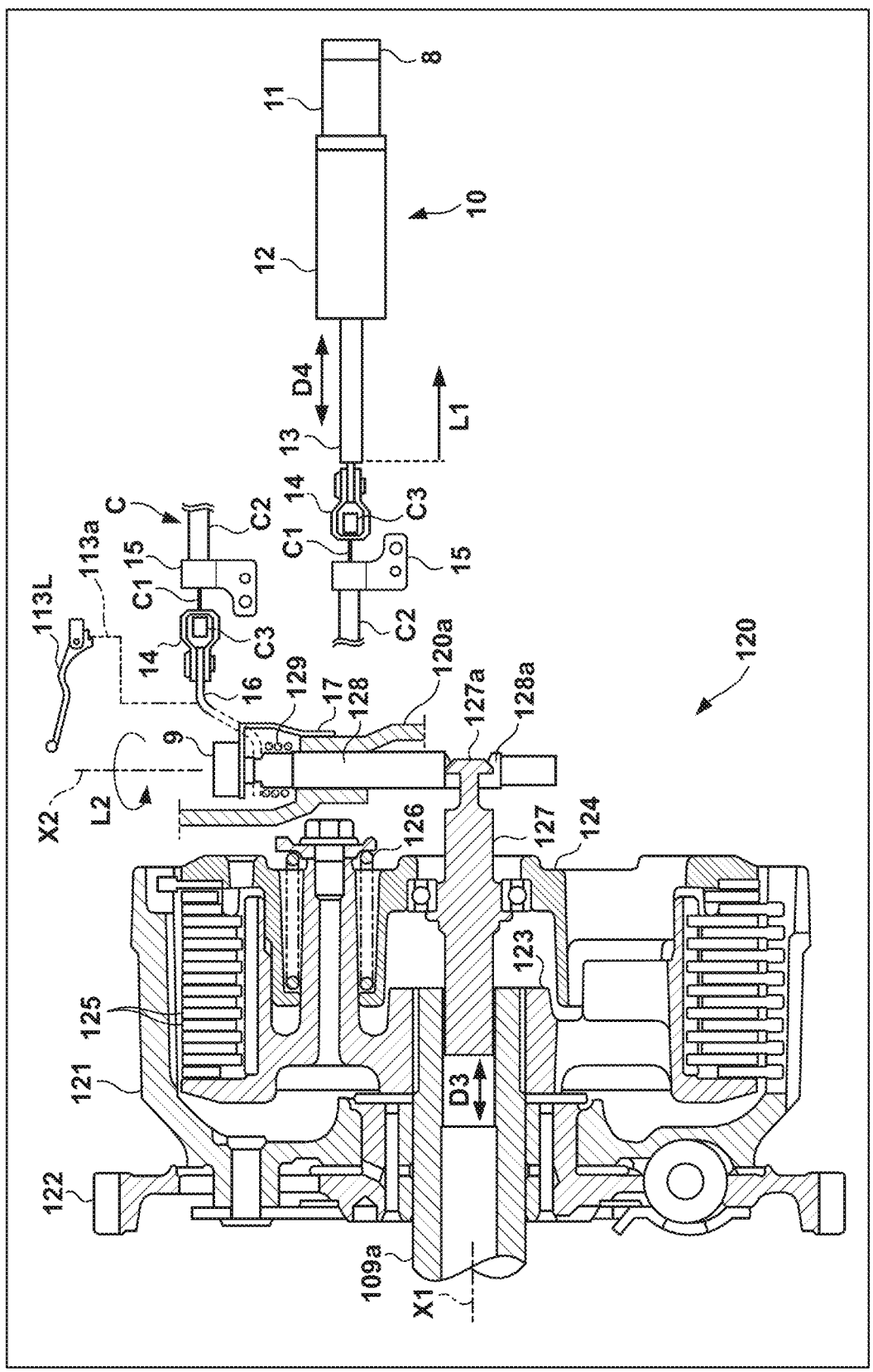
FIG. 4 is an explanatory view of a clutch device and a related configuration.

Here, an operation amount sensor 8, a displacement amount sensor 9, and an electric actuator 10 will be described with reference to FIG. 4 in addition to FIG. 3. FIG. 4 is an explanatory view of the clutch device 120 and a related configuration.

The clutch device 120 includes an input gear 122 to which a driving force of the prime mover 108 is input from a crankshaft (not illustrated) of the prime mover 108. A clutch outer 121 rotates integrally with the input gear 122 around a rotation center line X1. The rotation center line X1 is a rotation center line (axis) of a main shaft 109a of the transmission 109. The main shaft 109a is coupled to the clutch center 123 and rotates integrally with the clutch center 123. A plurality of disk-shaped clutch plates 125 are stacked in the direction of the rotation center line X1 between the clutch outer 121 and the clutch center 123.

In the plurality of clutch plates 125, clutch plates that rotate integrally with the clutch outer 121 and clutch plates that rotate integrally with the clutch center 123 are alternately arranged in the stacking direction, and the drive transmission between the clutch outer 121 and the clutch center 123, that is, the transmission of the driving force of the prime mover 108 to the transmission 109, is performed by frictional engagement between the plurality of clutch plates 125.

The plurality of clutch plates 125 are pressed in the stacking direction by a biasing force of a clutch spring 126 through a pressure plate 124 and frictionally engaged with each other. A plurality of clutch springs 126 is disposed around the rotation center line X1.

The clutch device 120 includes a lifter shaft 127 and a release operation member 128 as a release mechanism. An end portion of the lifter shaft 127 is inserted into the cylindrical main shaft 109a, and the lifter shaft 127 is provided to be movable in a reciprocating manner together with the pressure plate 124 in a D3 direction, which is a direction of the rotation center line X1. The release operation member 128 is a shaft member extending in a direction orthogonal to the axial direction (the D3 direction) of the lifter shaft 127, and is a member for blocking the drive transmission of the clutch device 120 by an external input.

The release operation member 128 is supported by a clutch cover 120a so as to be rotatable about an axis thereof (about a rotation center line X2), and an upper end thereof is exposed to the outside of the clutch cover 120a. The release operation member 128 has an eccentric cam portion 128a. The eccentric cam portion 128a is engaged with an engagement portion 127a at an end portion of the lifter shaft 127 inside the clutch cover 120a. When the release operation member 128 is rotated in a predetermined direction, the lifter shaft 127 is moved, due to the engagement between the eccentric cam portion 128a and the engagement portion 127a, in a direction (the right side of the D3 direction in FIG. 4) in which the frictional engagement between the plurality of clutch plates 125 is released. A rotation amount (an operation angle) of the release operation member 128 and a movement amount of the lifter shaft 127 in the D3 direction are proportional to each other. The rotation of the release operation member 128 changes a frictional engagement force between the plurality of clutch plates 125 to change a clutch capacity of the clutch device 120, and block the drive transmission.

An arm member 16 is fixed to an upper end portion of the release operation member 128. The arm member 16 is a lever member protruding in a radial direction of the release operation member 128, with one end thereof being fixed to the release operation member 128, and a connecting member C1 being connected to the other end thereof through a holder 14. A return spring 129 that biases the release operation member 128 to an initial position is provided between the arm member 16 and the clutch cover 120a.

The connecting member C1 is an elastically deformable wire member that connects the release operation member 128 and the electric actuator 10 to each other, and is, for example, a metal wire. The connecting member C1 according to the present embodiment is an inner cable of the cable C disposed between the release operation member 128 and the electric actuator 10, and the connecting member C1 may be referred to as an inner cable C1. A cylindrical engagement part C3 to be engaged with the holder 14 is fixed to each of both ends of the inner cable C1. The cable C includes an outer cable C2 through which the inner cable C1 is inserted. The outer cable C2 is a bendable tube with flexibility, and both end portions of the outer cable C2 are held by respective catchers 15. The catcher 15 on the clutch device 120 side is fixed to, for example, the clutch cover 120a. The catcher 15 on the electric actuator 10 side is fixed to the vehicle body frame 101 through a bracket (not illustrated), for example, in the vicinity of the electric actuator 10.

In the present embodiment, the electric actuator 10 is an electric cylinder in which a rod 13 moves in a reciprocating manner in a D4 direction. The electric actuator 10 includes a drive source 11 that is an electric motor, and a conversion mechanism unit 12 that converts a rotational motion of an output shaft of the drive source 11 into a linear motion of the rod 13. The conversion mechanism unit 12 incorporates, for example, a conversion mechanism such as a ball screw mechanism or a feed screw mechanism. The inner cable C1 is connected to the rod 13 through the holder 14.

When the inner cable C1 is pulled by driving the electric actuator 10, the release operation member 128 is rotated so that a clutch capacity of the clutch device 120 can be reduced. Conversely, when the inner cable C1 is returned (sent back), the release operation member 128 returns to its initial position due to the biasing of the clutch spring 126, so that the clutch capacity increases. To this end, the control unit 2 can control the drive source 11, thereby driving the electric actuator 10 to displace (rotate) the release operation member 128 and change the clutch capacity of the clutch device 120.

In the present embodiment, the electric cylinder is exemplified as the electric actuator 10, but the electric actuator 10 is not limited thereto. For example, the electric actuator 10 may be an electric drum including a drum capable of winding and rewinding the connecting member C1 or the like.

Basically, the connection or disconnection of the clutch device 120 in the present embodiment is performed automatically by the electric actuator 10. However, the operating element 113L is connected to the arm member 16 through a cable 113a, so that the rider can operate the operating element 113L to connect or disconnect the clutch device 120.

The operation amount sensor 8 is a sensor that detects an operation amount of the electric actuator 10 with respect to the connecting member C1, and is a rotary encoder that detects a rotation amount of the drive source 11 in the present embodiment. In the present embodiment, a detection result of the operation amount sensor 8 is converted into a movement amount of the rod 13 in the D4 direction, which is set as an operation amount L1 of the electric actuator 10 with respect to the connecting member C1. In other words, the operation amount L1 is a movement amount of an end of the connecting member C1 on the electric actuator 10 side. In the example of FIG. 4, a movement amount in a direction in which the rod 13 is retracted from an initial position (a maximum protruding position) of the rod 13 is set as the operation amount L1.

The displacement amount sensor 9 is a sensor that detects a displacement amount of the release operation member 128. In the present embodiment, the displacement amount sensor 9 is an angle sensor that detects a rotation amount (an operation angle) of the release operation member 128 about the rotation center line X2 as the displacement amount of the release operation member 128. The displacement amount sensor 9 is supported by the clutch cover 120a through a bracket 17, and an upper end of the release operation member 128 is connected to the displacement amount sensor 9.

<Control of Clutch Capacity>

When the vehicle 100 starts or when the transmission 109 changes its shift, the clutch capacity of the clutch device 120 is controlled from a drive transmission disconnected state to a drive transmission connected state. The control related to the clutch capacity (clutch pressing load/clutch spring load) of the clutch device 120 using the electric actuator 10 will be described.

The clutch device 120 according to the present embodiment is normally in a connected state (clutch capacity: 100%) by the biasing of the clutch spring 126, and it is possible to realize a decrease in clutch capacity (half-clutch state) and a disconnected state (clutch capacity: 0%) by a movement of the lifter shaft 127 according to a rotation of the release operation member 128. Therefore, the clutch capacity is correlated with a torque (or a rotation amount) around the rotation center line X2 of the release operation member 128.

Meanwhile, since the connecting member C1 is made of an elastic material, the connecting member C1 extends in proportion to the tensile load in the elastic region. Based on the Hooke's law, the elongation amount of the connecting member C1 is correlated with the torque around the rotation center line X2 of the release operation member 128, that is, the clutch capacity. When the elongation amount of the connecting member C1 is defined as L3, L3=operation amount L1−coefficient×rotation amount L2. The coefficient is a coefficient for converting the rotation amount L2 into a movement amount of the end of the connecting member C1 on the release operation member 128 side, and is set based on, for example, a length of the arm member 16 in the radial direction from the release operation member 128. The operation amount L1 and the rotation amount L2 can be detected by the operation amount sensor 8 and the displacement amount sensor 9. Therefore, it is possible to perform a control to change the clutch capacity of the clutch device 120 based on the detection results of the operation amount sensor 8 and the displacement amount sensor 9.

Figure 5:
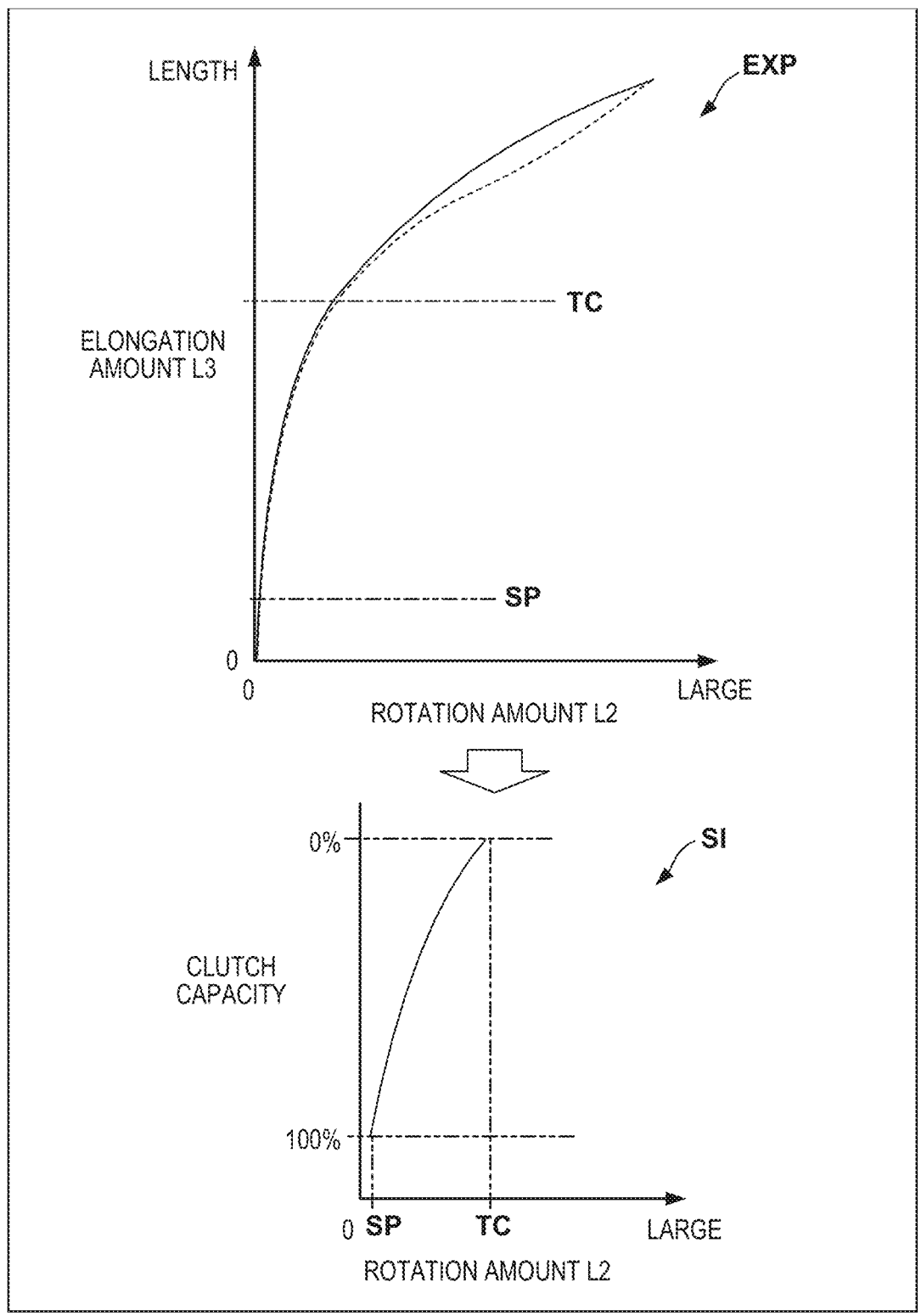
FIG. 5 is a view illustrating examples of test data and characteristic information.

Characteristic information indicating the correlation between the elongation amount L3 and the clutch capacity used for the control of the electric actuator 10 can be obtained by a learning operation in advance. FIG. 5 illustrates examples of test data EXP obtained by the learning operation and characteristic information SI obtained from the test data EXP.

In the learning operation, the electric actuator 10 is driven at least in a range corresponding to a clutch capacity change range (0 to 100%). For example, the electric actuator 10 is driven in such a manner that, in a state where the torque capacity of the clutch device 120 is 100% (it is sufficient that the release operation member 128 is in a free state), the rod 13 is full-stroked in a retracting direction from its initial position, and then returned to the initial position, so that the clutch capacity covers the range of 0% to 100%. An elongation amount L3 is calculated from detection results of the operation amount sensor 8 and the displacement amount sensor 9 during the driving of the electric actuator 10 to obtain the test data EXP of FIG. 5.

In the test data EXP, the horizontal axis represents a rotation amount L2 (corresponding to a tensile load of the connecting member C1), the vertical axis represents an elongation amount L3, the broken line represents data at the stage of pulling the connecting member C1, and the solid line represents data at the stage of releasing the pulling.

From this data, an operation start point SP and a touch point TC are specified. The operation start point SP is a point at which the clutch device 120 shifts from the connected state to the half-clutch state. The operation start point varies depending on the play of the mechanism, etc. The touch point TC is a point at which the clutch device 120 shifts from the disconnected state to the half-clutch state, and varies depending on the wear of the clutch plate 125, etc.

Both the operation start point SP and the touch point TC are specified from an inflection point at which an inclination changes in the test data EXP. For example, at the touch point TC, the change in the elongation amount L3 with respect to the rotation amount L2 slows.

The characteristic information SI indicates an operation start point SP and a touch point TC, and a correlation between a rotation amount L2 and a clutch capacity between the operation start point SP and the touch point TC. The characteristic information SI is stored in, for example, the storage unit 22.

In the above-described control for changing the clutch capacity based on the characteristic information SI, a feedback control of the drive source 11 may be performed while monitoring a detection result of the displacement amount sensor 9 so as to realize a rotation amount L2 corresponding to a target clutch capacity.

<Example of Process of Control Unit>

An example of a process of the control unit 2 regarding a control of the clutch device 120 will be described. First, the update of the characteristic information SI will be described. The correlation between the elongation amount L3 and the clutch capacity may vary depending on the wear or the like of the mechanism resulting from the use of the vehicle 100. Therefore, it is preferable that the characteristic information SI is not only set by the manufacturer at the time of shipping the vehicle 100, but also automatically updated as needed according to the use of the rider.

Figure 6:
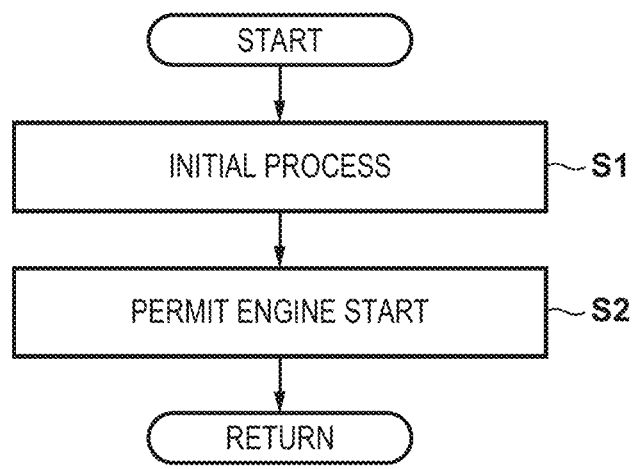
FIG. 6 is a flowchart illustrating an example of a process executed by the control unit of FIG. 3.
Figure 7:
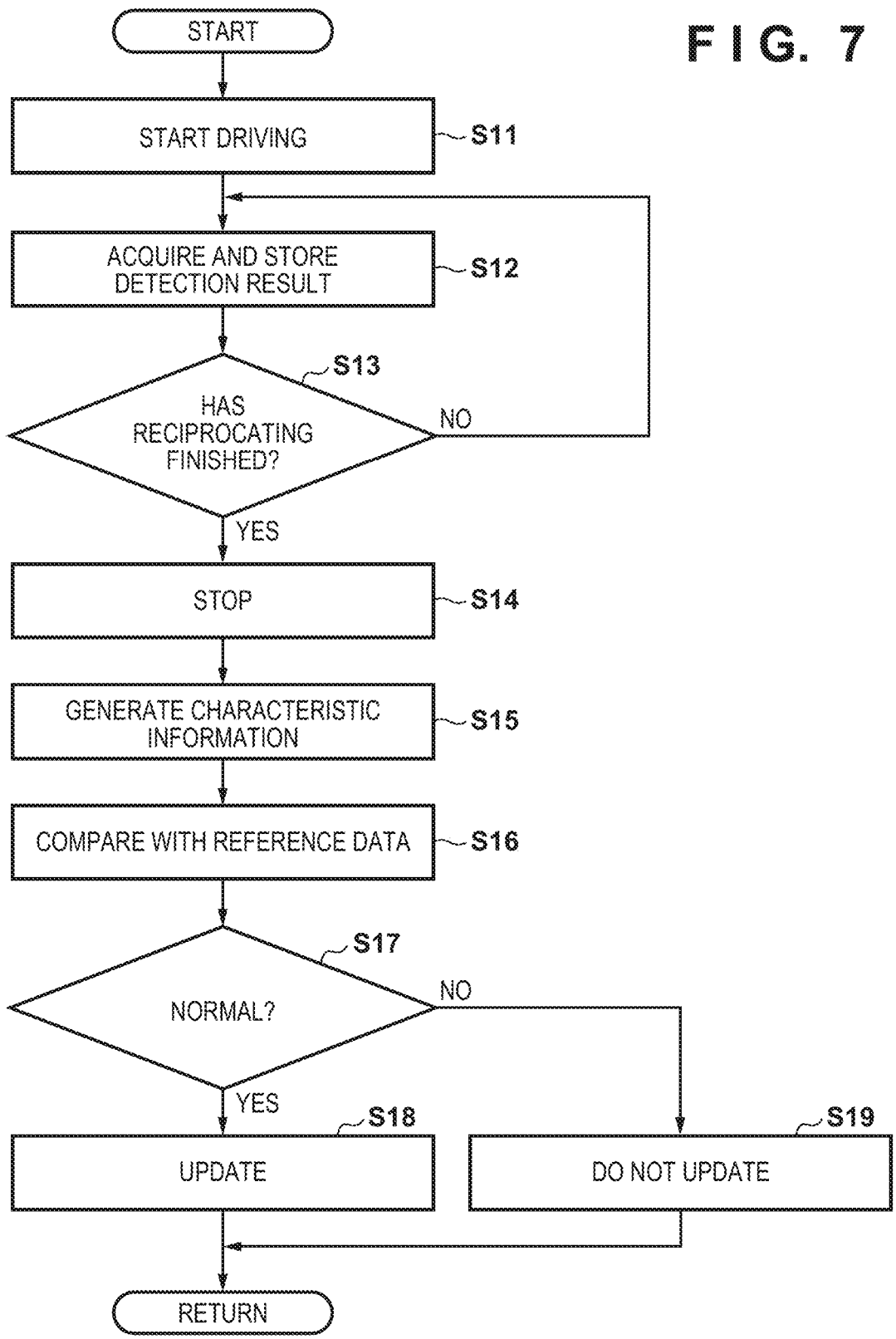
FIG. 7 is a flowchart illustrating an example of a process executed by a control unit of FIG. 3.

In the present embodiment, a process of generating/updating characteristic information SI is executed at the time of activating a control system of the vehicle 100 (at the time of turning on power, which is represented by ignition ON). FIG. 6 is a flowchart illustrating an example of a process executed by the processing unit 21 of the control unit 2 when the power is turned on. In S1, an initial process is performed. Here, the operation of the control device 1 is checked, and the movable part is moved to its initial position. In this initial process, a process of generating/updating characteristic information SI to be described below with reference to FIG. 7 is also performed. When the checking of the operation and the like are normally completed in the initial process of S1, the process proceeds to S2, where permission to start the prime mover 108 is set. When the rider operates a starter button (not illustrated), the prime mover 108 is started.

The process of generating/updating characteristic information SI included in the initial process of S1 will be described with reference to FIG. 7. In S11 to S14, a process related to the learning operation for obtaining the test data EXP exemplified in FIG. 5 is performed. In S11, the driving of the drive source 11 is started. Here, as described above, an operation of full-stroking the rod 13 of the electric actuator 10 in the retracting direction from its initial position, and then returning the rod 13 of the electric actuator 10 to the initial position is started, so that the clutch capacity covers the range of 0% to 100%. In S12, detection results of the operation amount sensor 8 and the displacement amount sensor 9 are acquired.

In S13, it is determined whether the reciprocation of the rod 13 of the electric actuator 10 has finished (whether the rod 13 of the electric actuator 10 has returned to its initial position), and if not, the process returns to S12 to continue to acquire detection results of the operation amount sensor 8 and the displacement amount sensor 9 and move the rod 13. When the reciprocation of the rod 13 has finished, the process proceeds to S14, and the driving of the drive source 11 and the acquisition of the detection results of the operation amount sensor 8 and the displacement amount sensor 9 are finished.

In S15, characteristic information SI is generated from the detection results of the operation amount sensor 8 and the displacement amount sensor 9. Here, for example, in a case where there is a foreign substance that hinders or resists the movement of the rod 13 or the rotation of the release operation member 128 during the learning operation, the accuracy of the characteristic information SI decreases. In order to exclude an update on characteristic information SI with low accuracy, in S16, the characteristic information SI generated in S15 is compared with reference data, and it is determined whether the characteristic information SI is normal data. The reference data is, for example, data capable of specifying a normal value range for the elongation amount L3 with respect to the clutch capacity, and may be data dedicated for comparison or may be current characteristic information SI (characteristic information SI before being updated) stored in the storage unit 22.

In S17, as a result of the comparison in S16, when the result is normal, the process proceeds to S18, and when the result is abnormal, the process proceeds to S19. In S18, the current characteristic information SI stored in the storage unit 22 is updated with the characteristic information SI generated this time in S15. In S19, no update is performed.

In this manner, the process of generating/updating characteristic information SI ends. Note that the process of S11 to S14 may be performed multiple times, and characteristic information SI may be generated using an average value of detection results of the operation amount sensor 8 and the displacement amount sensor 9.

Figure 8:
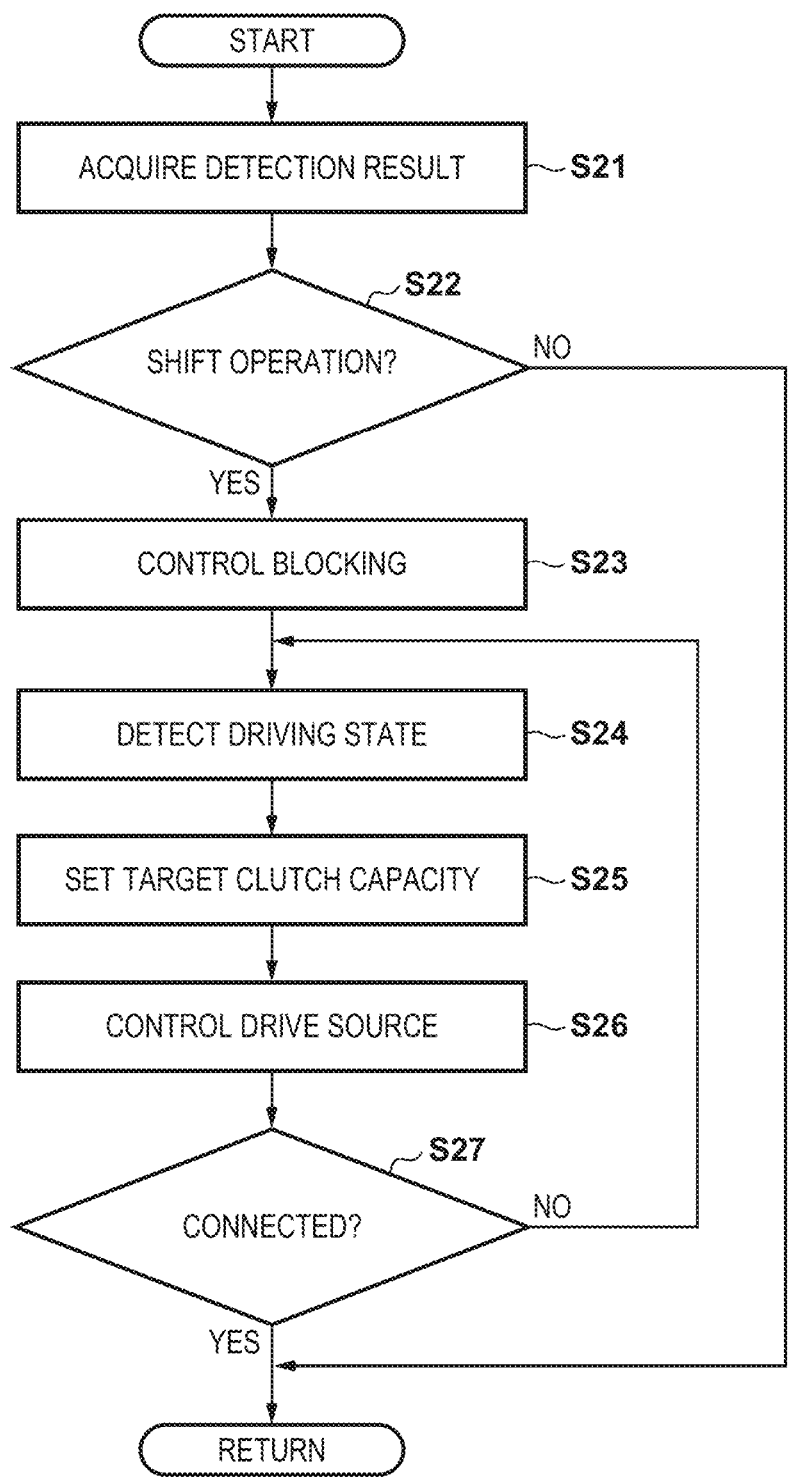
FIG. 8 is a flowchart illustrating an example of a process executed by the control unit of FIG. 3.

FIG. 8 is a flowchart illustrating an example in which the clutch capacity of the clutch device 120 is controlled using the characteristic information SI, and illustrates an example of a process executed by the processing unit 21 of the control unit 2. The illustrated process illustrates an example of a process executed when the clutch device 120 is in the connected state.

In S21, a detection result of the shift operation sensor 7 is acquired. In S22, it is determined whether the rider has performed a shift operation on the operating element 115L based on the detection result acquired in S21, and the process proceeds to S23 when it is determined that the shift operation has been performed. In S23, the electric actuator 10 is driven so that the clutch device 120 is in a disconnected state. Here, by reading the characteristic information SI from the storage unit 22, and driving the electric actuator 10 until the rotation amount L2 based on the detection result of the displacement amount sensor 9 becomes larger than the rotation amount L2 corresponding to the touch point TC, the clutch device 120 can be reliably shifted to the disconnected state.

S24 to S25 relate to a process of shifting the clutch device 120 to the connected state after a shift operation. In S24, a driving state of the vehicle 100 is detected. Here, detection results of the throttle opening sensor 3, the engine speed sensor 4, the shift position sensor 5, and the vehicle speed sensor 6 are acquired. In S25, a target value of a clutch capacity of the clutch device 120 is set based on the detection results acquired in S24. In S26, the drive control of the electric actuator 10 (the drive source 11) is performed so as to achieve the target value of the clutch capacity set in S25. Here, the characteristic information SI is read from the storage unit 22, the detection result of the displacement amount sensor 9 is monitored, and the feedback control of the drive source 11 is performed so that the rotation amount L2 becomes the rotation amount L2 corresponding to the target value of the clutch capacity set in S25.

In S27, it is determined whether or not the clutch device 120 has been shifted to the connected state (whether or not the clutch capacity is 100%), and when the clutch device has not been shifted to the connected state, the process returns to S24 and the similar process is repeated. When the clutch device 120 has been shifted to the connected state, the process ends. Through the above-described process, it is possible to automatically control the connection and disconnection of the clutch device 120 at the time of the shift change of the rider, and it is possible to realize a semi-automatic transmission system.

As described above, in the present embodiment, by adopting the configuration in which the release operation member 128 is operated by the electric actuator 10 through the connecting member C1, the control device 1 can be configured by utilizing the conventional manual-type clutch device 120 almost as is, and adding the electric actuator 10 and the sensors 8 and 9 outside the clutch device 120. Therefore, the automatic control of the clutch device 120 can be realized with a relatively simple configuration. Since the clutch capacity can be estimated from the elongation amount of the connecting member C1, the control of the clutch capacity can also be realized with a relatively simple configuration. Since the clutch device 120 and the electric actuator 10 can be arranged to be separated from each other through the connecting member C1, the degree of freedom in arranging the electric actuator 10 can also be improved. In the case where the connecting member C1 is bendable with flexibility, the degree of freedom in arranging the electric actuator 10 can be further improved. By generating the characteristic information SI, an automatic control corresponding to an individual difference in the clutch device 120 and the like can be performed. Furthermore, by appropriately updating the characteristic information SI, an automatic control of the clutch device 120 corresponding to a deterioration of the vehicle 100 over time can also be performed.

Second Embodiment

In a case where the connecting member C1 is short or in a case where the connecting member C1 is a shaft-shaped member having high rigidity, a significant elongation amount L3 may not be obtained. Therefore, configuration examples in FIG. 9 can also be adopted.

Figure 9:
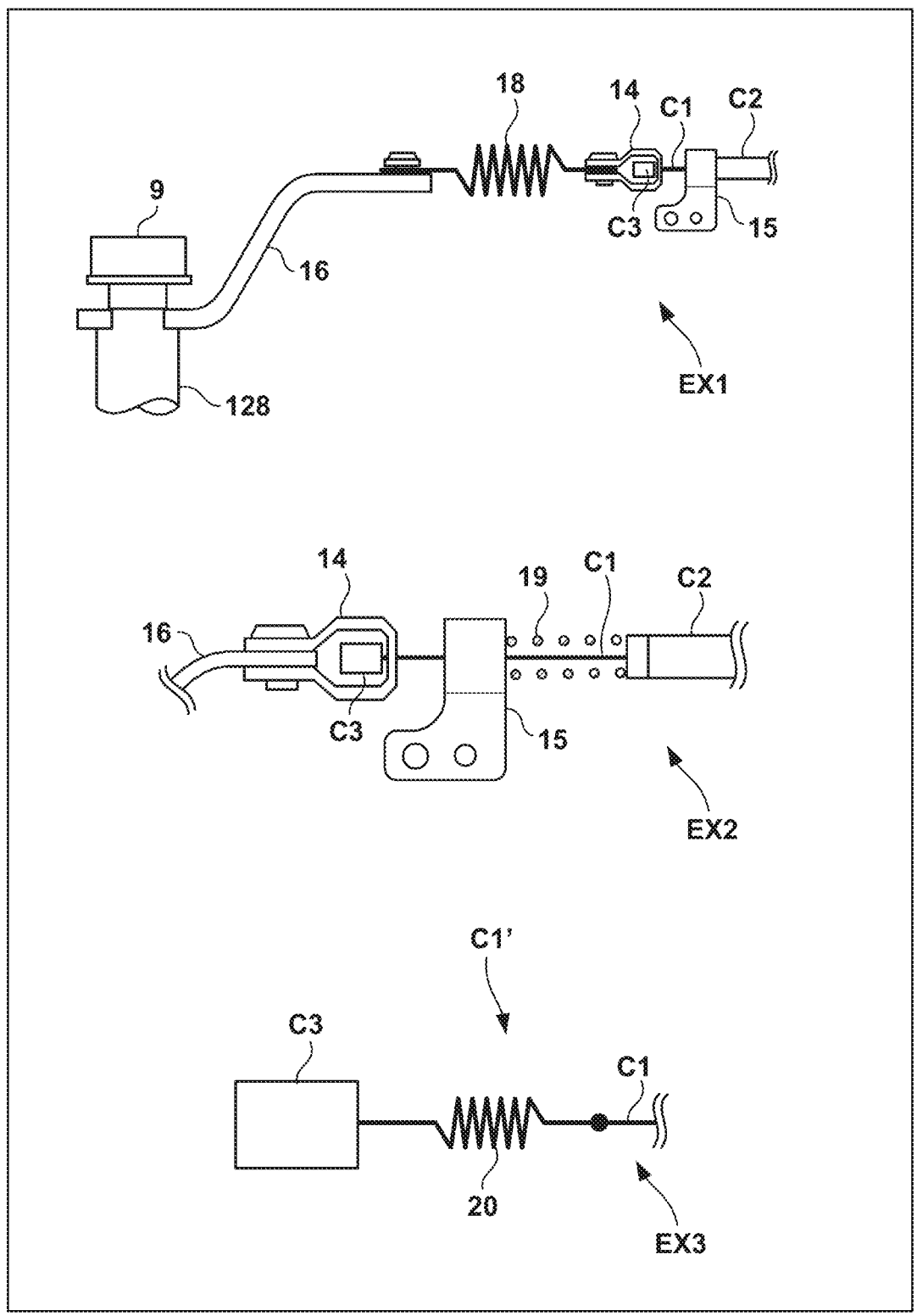
FIG. 9 is a view illustrating another configuration example related to a connecting member.

A configuration example EX1 in FIG. 9 is an example in which the connecting member (inner cable) C1 is connected to the release operation member 128 through an elastic member 18. The elastic member 18 is a coil spring in the illustrated example, and has an elastic coefficient smaller than an elastic coefficient of the connecting member (inner cable) C1. When a tensile load acts on the connecting member C1, the elastic member 18 also elongates. Therefore, the apparent elongation amount of the connecting member (inner cable) C1 obtained from the detection results of the sensors 8 and 9 becomes larger than the actual elongation amount of the connecting member C1, and a significant elongation amount L3 can be obtained.

Next, in a configuration example EX2 in FIG. 9, an end of the outer cable C2 on the release operation member 128 side is supported by the catcher 15 through an elastic member 19. In the illustrated example, the elastic member 19 is a coil spring. The total length of the outer cable C2 and the elastic member 19 can vary between the catcher 15 on the release operation member 128 side and the catcher 15 on the electric actuator 10 side. When the tensile load on the connecting member C1 is large, the elastic member 19 contracts, and the total length of the outer cable C2 and the elastic member 19 becomes short. Therefore, the apparent elongation amount of the connecting member (inner cable) C1 obtained from the detection results of the sensors 8 and 9 becomes larger than the actual elongation amount of the connecting member C1, and a significant elongation amount L3 can be obtained.

Next, a configuration example EX3 in FIG. 9 is an example in which a connecting member C1' is configured by connecting an inner cable C1 and an elastic member 20 to each other. While the configuration example EX1 is an example in which the elastic member is provided independently from the connecting member, the configuration example EX3 is an example in which the connecting member itself has a portion (the elastic member 20) where an elastic coefficient is relatively small and a portion (the inner cable C1) where an elastic coefficient is large. The elastic member 20 is a coil spring in the illustrated example. In this configuration example as well, even though a significant elongation amount L3 cannot be obtained in the inner cable C1, a significant elongation amount L3 can be obtained by the elastic deformation of the elastic member 20.

Third Embodiment

Figure 10:
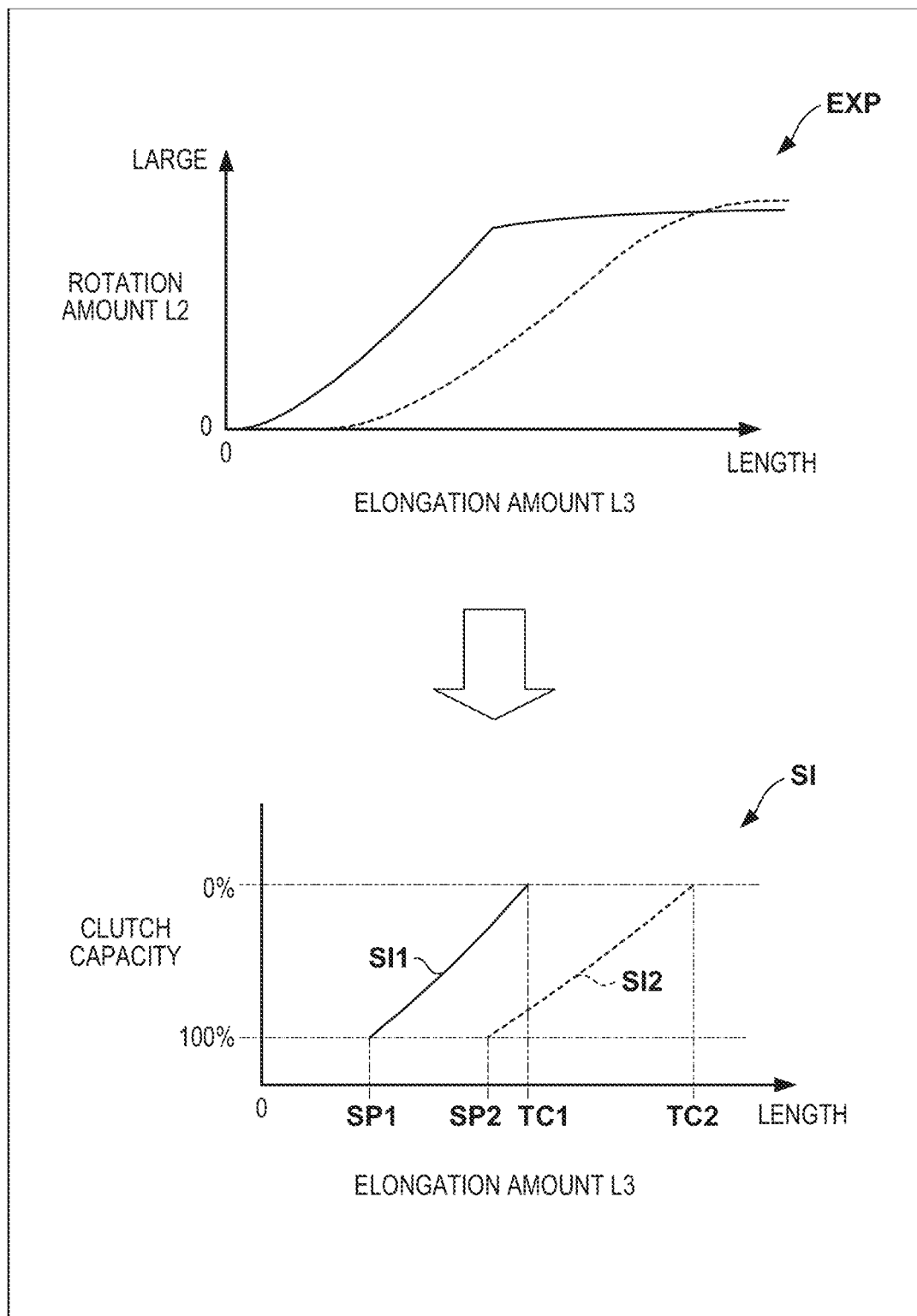
FIG. 10 is a view illustrating another example of characteristic information.

The characteristic information SI in FIG. 5 is information indicating a correlation between a clutch capacity and a rotation amount L2, but the characteristic information SI may be information indicating a correlation between a clutch capacity and an elongation amount L3. Hysteresis characteristics of the connecting member C1 may be considered. FIG. 10 illustrates examples of test data EXP and characteristic information SI in the present embodiment.

In a case where the connecting member C1 is a metal wire, an elongation amount thereof has hysteresis characteristics at the time of elongation and at the time of restoration. In the learning operation, as in the first embodiment, the electric actuator 10 is driven at least in a range corresponding to a clutch capacity change range (0 to 100%). For example, the electric actuator 10 is driven in such a manner that, in a state where the torque capacity of the clutch device 120 is 100% (it is sufficient that the release operation member 128 is in a free state), the rod 13 is full-stroked in a retracting direction from its initial position, and then returned to the initial position, so that the clutch capacity covers the range of 0% to 100%. An elongation amount L3 is calculated from detection results of the operation amount sensor 8 and the displacement amount sensor 9 during the driving of the electric actuator 10 to obtain the test data EXP of FIG. 10.

In the test data EXP, the vertical axis represents a rotation amount L2 (corresponding to a tensile load of the connecting member C1), the horizontal axis represents an elongation amount L3, the broken line represents data at the stage of pulling the connecting member C1, and the solid line represents data at the stage of releasing the pulling.

The characteristic information SI is obtained from the data. An operation start point and a touch point are specified from an inflection point or the like of the inclination of each type of data.

The characteristic information SI includes characteristic information SI1 and characteristic information SI2. The characteristic information SI2 is control information used when the clutch device 120 is shifted from a connected state to a disconnected state, and is control information used when the connecting member C1 is pulled by the electric actuator 10. The characteristic information SI2 includes an operation start point SP2 and a touch point TC2, and a correlation between an elongation amount L3 and a clutch capacity between the operation start point SP2 and the touch point TC2.

The characteristic information SI1 is control information used when the clutch device 120 is shifted from the disconnected state to the connected state, and is control information used when the connecting member C1 pulled by the electric actuator 10 is sent back and returned to its original length. The characteristic information SI1 includes an operation start point SP1 and a touch point TC1, and a correlation between an elongation amount L3 and a clutch capacity between the operation start point SP1 and the touch point TCL. The characteristic information SI is stored in, for example, the storage unit 22.

In the above-described control for changing the clutch capacity based on the characteristic information SI, a feedback control of the drive source 11 may be performed while monitoring detection results of the operation amount sensor 8 and the displacement amount sensor 9 so as to realize an elongation amount L3 corresponding to a target clutch capacity.

Concerning the process of FIG. 8 in a case where the characteristic information SI is configured as in the present embodiment, the difference from the first embodiment will be described. In S23, the characteristic information SI2 out of the two types of characteristic information SI1 and SI2 is read from the storage unit 22. Then, by driving the electric actuator 10 until the elongation amount L3 of the connecting member C1 based on the detection results of the operation amount sensor 8 and the displacement amount sensor 9 becomes longer than the elongation amount L3 corresponding to the touch point TC2, the clutch device 120 can be reliably shifted to the disconnected state.

In S26, the characteristic information SI1 is read from the storage unit 22, the detection results of the operation amount sensor 8 and the displacement amount sensor 9 are monitored, and the feedback control of the drive source 11 is performed so that the elongation amount L3 of the connecting member C1 becomes the elongation amount L3 corresponding to the target value of the clutch capacity set in S25.

In this manner, the characteristic information SI may be configured as information indicating a correlation between a clutch capacity and an elongation amount L3, and the hysteresis characteristic of the elongation of the connecting member C1 can also be considered.

Other Embodiments

In the clutch device 120 according to the above-described embodiment, the release operation member 128 is configured to change the clutch capacity by its rotational movement, but the release operation member 128 may be configured to change the clutch capacity by moving the lifter shaft 127 in the D3 direction by its translational movement in the D3 direction.

In the above-described embodiments, the electric actuator 10 is disposed in the front portion of the vehicle 100 (behind the front wheel steering unit 102), but the position where the electric actuator 10 is disposed is not limited thereto, and may be disposed in the rear portion of the vehicle 100 (for example, below the seat 106) or the side portion of the vehicle 100 (inside the vehicle body frame 101 near the fuel tank 105, or the like).

Summary of Embodiments

The above-described embodiments disclose at least the following control device.

1. The control device (1) of the embodiment is a control device for controlling a clutch device (120) disposed on a path along which a driving force output from a prime mover (108) is transmitted, the clutch device being configured to connect or disconnect transmission of the driving force, the control device comprising:

a connecting member (C1) connected to a release operation member (128) of the clutch device;

an electric actuator (10) connected to the connecting member (C1), the electric actuator being configured to displace the release operation member (128) through the connecting member (C1);

a control unit (2) configured to displace the release operation member (128) by driving the electric actuator (10) so as to change a clutch capacity of the clutch device (120);

a first sensor (8) configured to detect an operation amount (L1) of the electric actuator (10) with respect to the connecting member (C1); and a second sensor (9) configured to detect a displacement amount (L2) of the release operation member (128), wherein the control unit (2) is configured to generate characteristic information (SI) regarding the clutch capacity in advance, and to perform a control (FIG. 8) to change the clutch capacity based on the generated characteristic information (SI), and the characteristic information (SI) is generated (FIG. 7) based on each detection result of the first sensor (8) and the second sensor (9) at time of driving the electric actuator (10) to change the displacement amount of the release operation member (128).

According to this embodiment, it is possible to provide a control device capable of realizing an automatic control of a clutch device with a relatively simple configuration. The clutch capacity can be controlled based on the elongation amount of the connecting member.

2. In the embodiment,
the connecting member (C1) is connected to the release operation member (128) through an elastic member (18) having an elastic coefficient smaller than an elastic coefficient of the connecting member (C1).

According to this embodiment, even though the elongation amount of the connecting member is small, it is possible to increase the apparent elongation amount based on the respective detection results of the first sensor and the second sensor.

3. In the embodiment,
a cable (C) is provided between the release operation member (128) and the electric actuator (10), the cable (C) including an outer cable (C2) and an inner cable (C1) inserted through the outer cable,
the inner cable (C1) is the connecting member, and
an end portion of the outer cable (C2) on a side closer to the release operation member (128) is supported by a catcher (15) through an elastic member (19).

According to this embodiment, even though the elongation amount of the connecting member is small, it is possible to increase the apparent elongation amount based on the respective detection results of the first sensor and the second sensor.

4. In the embodiment,
the clutch device (120) is disposed between an internal combustion engine (108) and a transmission (109) in a straddle type vehicle (100) to connect or disconnect transmission of a driving force of the internal combustion engine (108) to the transmission (109), and
the control unit (2) is configured to execute a process of generating the characteristic information when the straddle type vehicle (100) is powered on.

According to this embodiment, the clutch device can be automatically controlled to cope with a deterioration of the straddle type vehicle over time.

5. In the embodiment,
when the characteristic information (SI) is generated, the control unit (2) is configured to drive the electric actuator (10) at least within a range corresponding to a range of a change in the clutch capacity.

According to this embodiment, information between disconnection and connection of the clutch device can be obtained as the characteristic information.

6. In the embodiment, wherein
the characteristic information (SI) is information indicating a relationship between the clutch capacity and a difference between the operation amount and the displacement amount (FIG. 10).

According to this embodiment, a clutch capacity can be controlled by monitoring an elongation amount of the connecting member.

7. In the embodiment,
the characteristic information (SI) is information indicating a relationship between the clutch capacity and the displacement amount (FIG. 5).

According to this embodiment, a clutch capacity can be controlled by monitoring the displacement amount of the release operation member.

8. In the embodiment,
when the characteristic information is generated, the control unit (2) is configured to calculate a difference (L3) between the operation amount (L1) detected by the first sensor (8) and the displacement amount (L2) detected by the second sensor (9) at the time of driving the electric actuator (10) to change the displacement amount of the release operation member (128), and to specify a change in the clutch capacity from a change of the difference.

According to this embodiment, it is possible to relatively easily specify the correlation between the clutch capacity and the elongation amount of the connecting member.

While an embodiment has been described, the invention is not limited to the foregoing embodiments, and various variations/changes are possible within the spirit of the invention.

What is claimed is:

1. A control device for controlling a clutch device disposed on a path along which a driving force output from a prime mover is transmitted, the clutch device being configured to connect or disconnect transmission of the driving force, the control device comprising:
a connecting member connected to a release operation member of the clutch device;
an electric actuator connected to the connecting member, the electric actuator being configured to displace the release operation member through the connecting member;
a control unit configured to displace the release operation member by driving the electric actuator so as to change a clutch capacity of the clutch device;
a first sensor for detect an operation amount of the electric actuator with respect to the connecting member; and
a second sensor configured to detect a displacement amount of the release operation member,
wherein the control unit is configured to generate characteristic information regarding the clutch capacity in advance, and to perform a control to change the clutch capacity based on the generated characteristic information,
the characteristic information is generated based on each detection result of the first sensor and the second sensor at time of driving the electric actuator to change the displacement amount of the release operation member, and
the connecting member is connected to the release operation member through an elastic member having an elastic coefficient smaller than an elastic coefficient of the connecting member.

2. The control device according to claim 1, wherein
the clutch device is disposed between an internal combustion engine and a transmission in a straddle type vehicle to connect or disconnect transmission of a driving force of the internal combustion engine to the transmission, and
the control unit is configured to execute a process of generating the characteristic information when the straddle type vehicle is powered on.

3. The control device according to claim 1, wherein
when the characteristic information is generated, the control unit is configured to drive the electric actuator at least within a range corresponding to a range of a change in the clutch capacity.

4. The control device according to claim 1, wherein
the characteristic information is information indicating a relationship between the clutch capacity and a difference between the operation amount and the displacement amount.

5. The control device according to claim 1, wherein
the characteristic information is information indicating a relationship between the clutch capacity and the displacement amount.

6. The control device according to claim 1, wherein
when the characteristic information is generated, the control unit is configured to calculate a difference between the operation amount detected by the first sensor and the displacement amount detected by the second sensor at the time of driving the electric actuator to change the displacement amount of the release operation member, and to specify a change in the clutch capacity from a change of the difference.

7. A control device for controlling a clutch device disposed on a path along which a driving force output from a prime mover is transmitted, the clutch device being configured to connect or disconnect transmission of the driving force, the control device comprising:
a connecting member connected to a release operation member of the clutch device;
an electric actuator connected to the connecting member, the electric actuator being configured to displace the release operation member through the connecting member;
a control unit configured to displace the release operation member by driving the electric actuator so as to change a clutch capacity of the clutch device;
a first sensor configured to detect an operation amount of the electric actuator with respect to the connecting member; and
a second sensor configured to detect a displacement amount of the release operation member,
wherein the control unit is configured to generate characteristic information regarding the clutch capacity in advance, and to perform a control to change the clutch capacity based on the generated characteristic information,
the characteristic information is generated based on each detection result of the first sensor and the second sensor at time of driving the electric actuator to change the displacement amount of the release operation member,
a cable is provided between the release operation member and the electric actuator, the cable including an outer cable and an inner cable inserted through the outer cable,
the inner cable is the connecting member, and
an end portion of the outer cable on a side closer to the release operation member is supported by a catcher through an elastic member.

8. The control device according to claim 7, wherein
the clutch device is disposed between an internal combustion engine and a transmission in a straddle type vehicle to connect or disconnect transmission of a driving force of the internal combustion engine to the transmission, and
the control unit is configured to execute a process of generating the characteristic information when the straddle type vehicle is powered on.

9. The control device according to claim 7, wherein
when the characteristic information is generated, the control unit is configured to drive the electric actuator at least within a range corresponding to a range of a change in the clutch capacity.

10. The control device according to claim 7, wherein
the characteristic information is information indicating a relationship between the clutch capacity and a difference between the operation amount and the displacement amount.

11. The control device according to claim 7, wherein
the characteristic information is information indicating a relationship between the clutch capacity and the displacement amount.

12. The control device according to claim 7, wherein
when the characteristic information is generated, the control unit is configured to calculate a difference between the operation amount detected by the first sensor and the displacement amount detected by the second sensor at the time of driving the electric actuator to change the displacement amount of the release operation member, and to specify a change in the clutch capacity from a change of the difference.

* * * * *